(12) United States Patent
Woo et al.

(10) Patent No.: US 9,497,245 B2
(45) Date of Patent: Nov. 15, 2016

(54) APPARATUS AND METHOD FOR LIVE STREAMING BETWEEN MOBILE COMMUNICATION TERMINALS

(75) Inventors: Sang-Wook Woo, Suwon-si (KR); Sang-Bong Lee, Suwon-si (KR); Woo-Jun Choi, Hwaseong-si (KR); Yong Shin, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 819 days.

(21) Appl. No.: 13/167,843

(22) Filed: Jun. 24, 2011

(65) Prior Publication Data

US 2011/0320571 A1    Dec. 29, 2011

(30) Foreign Application Priority Data

Jun. 24, 2010  (KR) ........................ 10-2010-0059812

(51) Int. Cl.
| | |
|---|---|
| G06F 15/16 | (2006.01) |
| H04L 29/06 | (2006.01) |
| H04N 21/414 | (2011.01) |
| H04N 21/643 | (2011.01) |
| H04N 21/6437 | (2011.01) |
| H04W 4/12 | (2009.01) |

(52) U.S. Cl.
CPC ...... *H04L 65/607* (2013.01); *H04N 21/41407* (2013.01); *H04N 21/6437* (2013.01); *H04N 21/64322* (2013.01); *H04W 4/12* (2013.01)

(58) Field of Classification Search
None
See application file for complete search history.

(56) References Cited

U.S. PATENT DOCUMENTS

| | | | | |
|---|---|---|---|---|
| 7,580,430 | B2* | 8/2009 | Jang | 370/537 |
| 7,853,711 | B1* | 12/2010 | Johnson et al. | 709/231 |
| 7,899,170 | B2* | 3/2011 | Jeong et al. | 379/202.01 |
| 7,908,628 | B2* | 3/2011 | Swart et al. | 725/93 |
| 8,244,315 | B2* | 8/2012 | Lee et al. | 455/575.1 |
| 8,319,817 | B2* | 11/2012 | Roo et al. | 348/14.01 |
| 8,396,197 | B2* | 3/2013 | Jiang | 379/93.21 |
| 8,437,624 | B2* | 5/2013 | Chatterton | 386/343 |
| 8,478,880 | B2* | 7/2013 | Finkelstein et al. | 709/227 |
| 2001/0028463 | A1* | 10/2001 | Iwamura | 358/1.1 |
| 2002/0067744 | A1* | 6/2002 | Fujii et al. | 370/535 |
| 2007/0011277 | A1* | 1/2007 | Neff et al. | 709/218 |
| 2007/0065122 | A1 | 3/2007 | Chatterton | |
| 2007/0206590 | A1* | 9/2007 | Baek et al. | 370/389 |
| 2007/0226775 | A1* | 9/2007 | Andreasen | H04L 63/0227 726/1 |
| 2009/0116551 | A1* | 5/2009 | Nilsson et al. | 375/240.03 |
| 2009/0298485 | A1 | 12/2009 | Lee et al. | |
| 2010/0153575 | A1* | 6/2010 | Liu et al. | 709/231 |
| 2010/0177786 | A1* | 7/2010 | Signaoff et al. | 370/466 |
| 2011/0136483 | A1* | 6/2011 | Dwight et al. | 455/422.1 |
| 2011/0306325 | A1* | 12/2011 | Gutta et al. | 455/414.1 |
| 2013/0125171 | A1* | 5/2013 | Sharif-Ahmadi et al. | 725/43 |

OTHER PUBLICATIONS

Notice of Preliminary Rejection dated Mar. 31, 2016 in connection with Korean Application No. 10-2010-0059812, 8 pages.

\* cited by examiner

*Primary Examiner* — Chris Parry
*Assistant Examiner* — Stephen Houlihan

(57) ABSTRACT

An apparatus and method support live streaming between mobile communication terminals. A server Mobile Station (MS) Transport Stream (TS)-multiplexes audio/video data, generates TS data, and transmits the generated TS data in a live streaming scheme to a client MS through an accessed IP based packet service network. A client MS receives the TS data generated by the server MS in the live streaming scheme through the accessed IP based packet service network, TS-demultiplexes the received TS data, and restores the original audio/video data.

18 Claims, 4 Drawing Sheets

APPARATUS AND METHOD FOR LIVE STREAMING BETWEEN MOBILE COMMUNICATION TERMINALS

CROSS-REFERENCE TO RELATED APPLICATION(S) AND CLAIM OF PRIORITY

The present application claims priority under 35 U.S.C. §119(a) to a Korean Patent Application filed in the Korean Intellectual Property Office on Jun. 24, 2010 and assigned Serial No. 10-2010-0059812, the contents of which are herein incorporated by reference.

TECHNICAL FIELD OF THE INVENTION

The present invention relates to an apparatus and method for live streaming between mobile communication terminals. More particularly, the present invention relates to an apparatus and method for live streaming between a server Mobile Station (MS) and a client MS.

BACKGROUND OF THE INVENTION

In recent years, the use of personally portable mobile communication terminals such as portable phones, Personal Digital Assistants (PDAs), and has become ubiquitous. With the development of communication technology, these mobile communication terminals are providing supplementary functions such as a game function using a variety of images and sounds, an alarm function, an MPEG-1 Audio Layer 3 (MP3) player function, and such, in addition to a communication function such as a call function or a Short Message Service (SMS) function. As such, the mobile communication terminals now provide users with various use conveniences in addition to their own call functions.

Furthermore, the recent mobile communication terminals supporting live streaming services are being put in the market. Here, streaming represents a technology for dividing a digital file into a plurality of packets and live transmitting the packets in succession. The conventional live streaming service uses a scheme in which, if an MS transmits video/audio data acquired through capturing to a live streaming server, the live streaming server converts the video/audio data into a type suitable to live streaming and transmits, in a live streaming scheme, the converted video/audio data to another MS accessing the live streaming server.

However, in the conventional live streaming service, a separate live streaming server realizing a live streaming protocol such as a Real-time Transport Protocol (RTP), a Real-Time Streaming Protocol (RTSP), and such should exist outside, and only a player (e.g., a Personal Computer (PC) and an MS) realizing the live streaming protocol can access the live streaming server to receive and reproduce live streaming data. That is, there is a problem that a player not realizing the live streaming protocol cannot receive and reproduce the live streaming data.

SUMMARY OF THE INVENTION

To address the above-discussed deficiencies of the prior art, a primary aspect of the present invention is to substantially solve at least the above problems and/or disadvantages and to provide at least the advantages below. Accordingly, one aspect of the present invention is to provide an apparatus and method for live streaming between mobile communication terminals.

Another aspect of the present invention is to provide an apparatus and method for live streaming between a server Mobile Station (MS) accessing an Internet Protocol (IP) based packet service network and a client MS, without going through a separate live streaming server.

A further aspect of the present invention is to provide an apparatus and method for an MS not realizing a live streaming protocol to access an IP based packet service network and perform live streaming.

Yet another aspect of the present invention is to provide an apparatus and method in which, after accessing an IP based packet service network using a HyperText Transfer Protocol (HTTP) protocol, a server MS generates Transport Stream (TS) data using a TS multiplexer, and transmits the generated TS data to a client MS in a live streaming scheme without going through a separate live streaming server.

Still another aspect of the present invention is to provide an apparatus and method for, after accessing an IP based packet service network using a HTTP protocol, receiving TS data in a live streaming scheme from a server MS without going through a separate live streaming server, and then reproducing the received TS data using a TS demultiplexer.

The above aspects are achieved by providing an apparatus and method for live streaming between mobile communication terminals.

According to one aspect of the present invention, a method of a server MS for live streaming between mobile communication terminals is provided. Audio/video data is TS-multiplexed, and TS data is generated. The generated TS data is transmitted in a live streaming scheme to a client MS through an accessed IP based packet service network.

According to another aspect of the present invention, a method of a client MS for live streaming between mobile communication terminals is provided. TS data generated by a server MS is received in a live streaming scheme from the server MS through the accessed IP based packet service network. The received TS data is TS-demultiplexed, and the original audio/video data is restored.

According to another aspect of the present invention, a server MS for live streaming between mobile communication terminals is provided. The server MS includes a TS multiplexer and an HTTP processor. The TS multiplexer TS-multiplexes audio/video data and generates TS data. The HTTP processor transmits the generated TS data in a live streaming scheme to a client MS through an accessed IP based packet service network.

According to yet another aspect of the present invention, a client MS for live streaming between mobile communication terminals is provided. The client MS includes an HTTP processor and a TS demultiplexer. The HTTP processor receives TS data generated by a server MS in a live streaming scheme from the server MS through an accessed IP based packet service network. The TS demultiplexer TS-demultiplexes the received TS data and restores the original audio/video data.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication terminal.

Embodiments of the present invention present a way for live streaming between mobile communication terminals. Particularly, the embodiments of the present invention present a way for a server MS and a client MS to perform live streaming using an internal Transport Stream (TS) multiplexer/demultiplexer, even without going through a separate live streaming server.

In the following description, a mobile communication terminal may refer to any of a cellular phone, a Personal Communication System (PCS), a Personal Data Assistant (PDA), an International Mobile Telecommunication-2000 (IMT-2000) terminal, a Personal Computer (PC), a notebook computer and such. The following description is made by means of the general construction of the above examples.

Furthermore, in the following description, a server MS and a client MS are MSs accessible to an IP based packet service network (e.g., Long Term Evolution (LTE), Wireless Fidelity (WiFi) network, and such) using a HyperText Transfer Protocol (HTTP) protocol. In detail, the server MS represents an MS that provides live streaming data, and the client MS represents an MS that receives and reproduces live streaming data.

Figure 1:
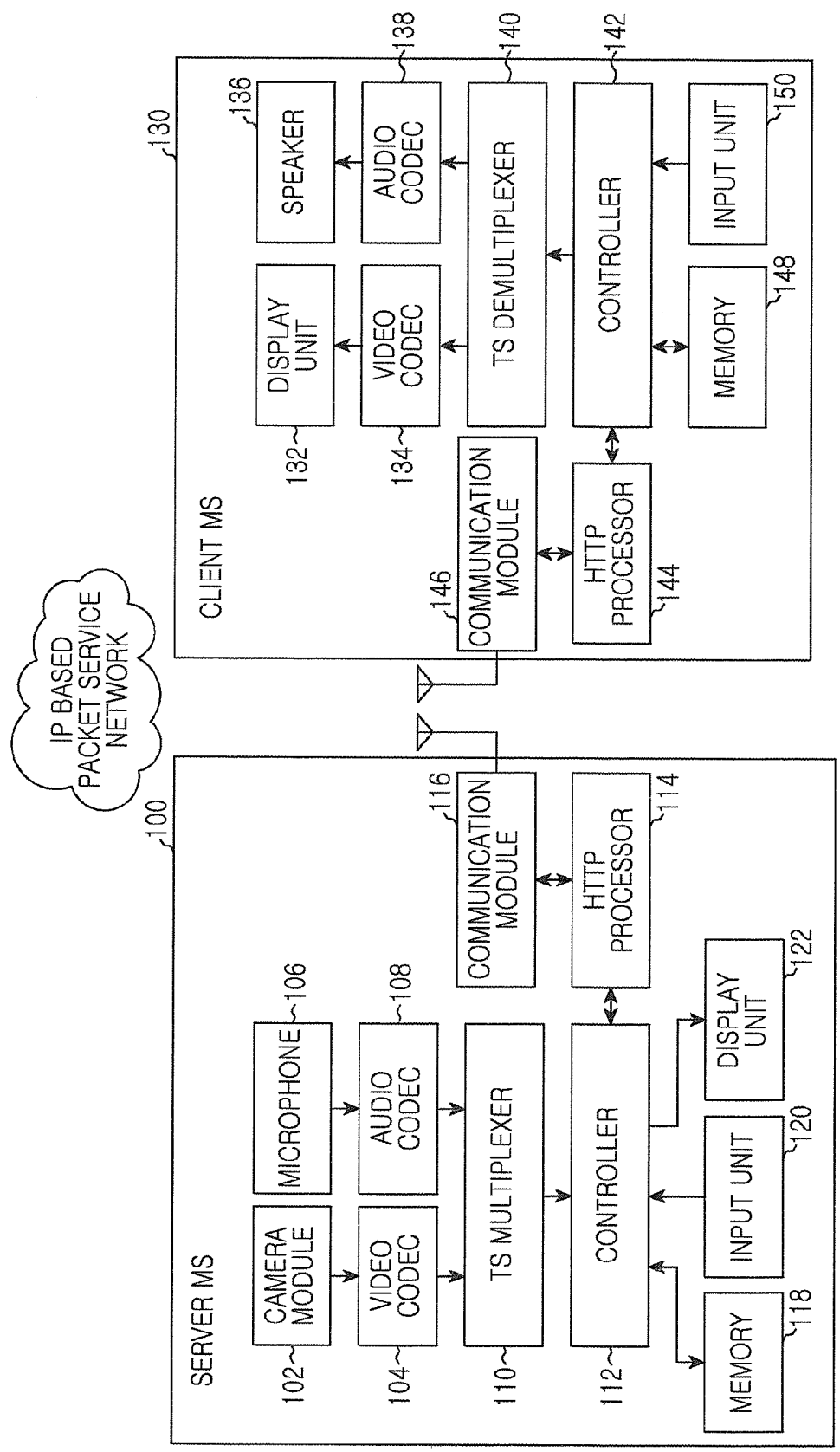
FIG. 1 is a block diagram of a server Mobile Station (MS) and a client MS for live streaming between mobile communication terminals according to an embodiment of the present invention.

FIG. 1 is a block diagram of a server MS and client MS for live streaming between mobile communication terminals according to an embodiment of the present invention.

As illustrated in FIG. 1, the server MS 100 includes a camera module 102, a video codec (coder-decoder) 104, a microphone 106, an audio codec 108, a TS multiplexer 110, a controller (e.g., a Micro-Processor Unit (MPU)) 112, an HTTP processor 114, a communication module 116, a memory 118, an input unit 120, and a display unit 122. The client MS 130 includes a display unit 132, a video codec 134, a speaker 136, an audio codec 138, a TS demultiplexer 140, a controller 142, an HTTP processor 144, a communication module 146, a memory 148, and an input unit 150.

Referring to FIG. 1, the apparatus construction of the server MS 100 is described. The camera module 102 includes a camera sensor for converting a light signal sensed at image capture into an electrical signal, and a signal processor for converting an analog video signal captured from the camera sensor into digital video data. Here, the camera sensor can be a Charge Coupled Device (CCD) sensor, and the signal processor can be a Digital Signal Processor (DSP).

The video codec 104 encodes Video (V) data provided from the camera module 102, in a set scheme.

The microphone 106 generates Audio (A) data such as a voice and the like.

The audio codec 108 encodes the A data provided from the microphone 106, in a set scheme.

The TS multiplexer 110 TS-multiplexes the encoded A/V data provided from the audio codec 108/video codec 104 to generate TS data and provides the generated TS data to the controller 112.

The controller 112 controls a general operation of the server MS 100. For example, the controller 112 performs processing and control for voice communication and data communication. In addition to a general function, according to the present invention, the controller 112 processes a function for live streaming between mobile communication terminals. Particularly, the controller 112 processes a function for, after accessing an IP based packet service network using an HTTP protocol, generating TS data using the TS multiplexer 110 and transmitting the generated TS data to the client MS 130 in a live streaming scheme, without going through a separate live streaming server.

The HTTP processor 114 accesses the IP based packet service network using the HTTP protocol, and then according to a request from the client MS 130, the HTTP processor 114 transmits the generated TS data provided from the controller 112, in a live streaming scheme to the client MS 130 through the communication module 116 without going through a separate live streaming server.

The communication module 116 includes an RF transmitter for up-converting and amplifying a frequency of a transmitted signal, an RF receiver for low-noise amplifying a received signal and down-converting a frequency, and such.

The memory 118 stores a microcode of a program for processing and control of the controller 112 and a variety of reference data. According to an embodiment of the present invention, the memory 118 stores a program for live streaming between mobile communication terminals. Furthermore, the memory 118 stores temporary data generated during execution of various programs and may store the generated TS data.

The input unit 120 may include a plurality of function keys such as a numeral key button, a menu button, a cancel button (delete), an OK button, a capture button and such, and provides key input data corresponding to a key pressed by a user to the controller 112.

The display unit 122 displays state information generated during an operation of the server terminal 100, a number of characters, a large amount of moving pictures, still pictures, and so forth. The display unit 122 may utilize any appropriate display technology, such as a color Liquid Crystal Display (LCD).

Next, the apparatus construction of the client MS 130 is described. The display unit 132 displays state information generated during an operation of the client terminal 130, a number of characters, a large amount of moving pictures, still pictures, and so forth. The display unit 132 may utilize any appropriate display technology, such as an LCD. According to an embodiment of the present invention, the display unit 132 reproduces V data provided from the video codec 134.

The video codec 134 decodes encoded V data provided from the TS demultiplexer 140 in a scheme that is set according to the server MS 100, restores the original V data, and outputs the restored V data to the display unit 132.

The speaker 136 reproduces A data provided from the audio codec 138.

The audio codec 138 decodes encoded A data provided from the TS demultiplexer 140 in a scheme that is set according to the server MS 100, restores the original A data, and outputs the restored A data to the speaker 136.

The TS demultiplexer 140 TS-demultiplexes TS data provided from the controller 142 to acquire encoded A/V data, and provides the acquired encoded A/V data to the audio codec 138/video codec 134.

The controller 142 controls a general operation of the client MS 130. For example, the controller 142 performs processing and control for voice communication and data communication. In addition to a general function, according to the present invention, the controller 142 processes a function for live streaming between mobile communication terminals. In an embodiment, the controller 142 processes a function for, after accessing the IP based packet service network using the HTTP protocol, receiving TS data from the server MS 100 in a live streaming scheme without going through a separate live streaming server, and then reproducing the received TS data using the TS demultiplexer 140.

After the HTTP processor 144 accesses the IP based packet service network using the HTTP protocol, the HTTP processor 144 sends a request to the server MS 100, receives TS data in a live streaming scheme from the server MS 100 through the communication module 146 without going through a separate live streaming server, and outputs the received TS data to the controller 142.

The communication module 146 includes an RF transmitter for up-converting and amplifying a frequency of a transmitted signal, an RF receiver for low-noise amplifying a received signal and down-converting a frequency, and so forth.

The memory 148 stores a microcode of a program for processing and control of the controller 142 and a variety of reference data. According to an embodiment of the present invention, the memory 148 stores a program for live streaming between mobile communication terminals. Furthermore, the memory 148 stores temporary data generated in execution of various programs and may store the received TS data.

The input unit 150 may include a plurality of function keys such as a numeral key button, a menu button, a cancel button (delete), an OK button, a capture button, and such, and provides key input data corresponding to a key pressed by a user to the controller 142.

In addition, when the client MS 130 is an MS capable of receiving and reproducing Digital Multimedia Broadcasting (DMB) data, the client MS 130 additionally includes a DMB communication module (not shown). The DMB communication module (not shown) receives, by means of a broadcasting channel, DMB data through a path separate from a TS data reception path, and outputs the received DMB data to the controller 142. In this situation, the controller 142 initializes the TS demultiplexer 140 for DMB data, and provides the received DMB data to the TS demultiplexer 140. The TS demultiplexer 140 then processes the DMB data.

Figure 2:
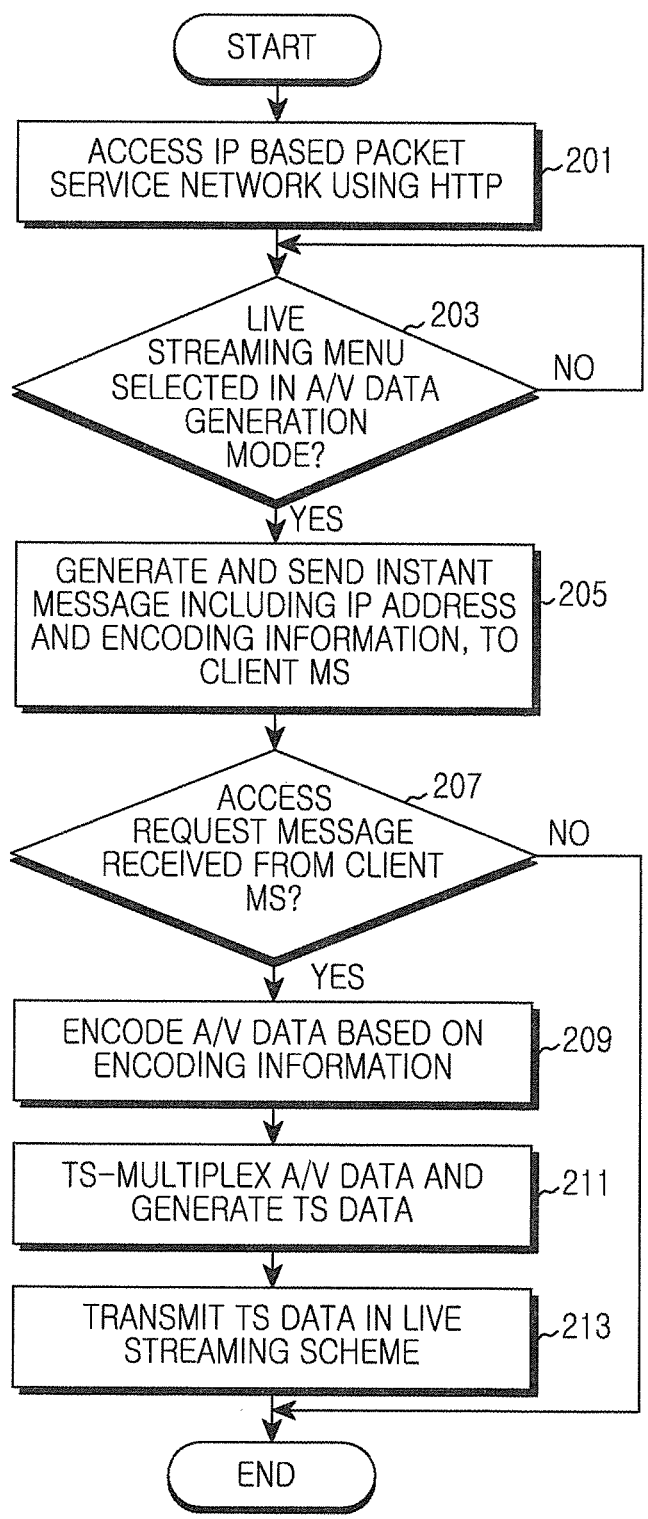
FIG. 2 illustrates a process of a server MS for live streaming between mobile communication terminals according to an embodiment of the present invention.

FIG. 2 illustrates a process of a server MS for live streaming between mobile communication terminals according to an embodiment of the present invention.

Referring to FIG. 2, in step 201, the server MS accesses an IP based packet service network (e.g., LTE, WiFi network) using an HTTP protocol.

In step 203, the server MS determines whether a menu for live streaming of A/V data is selected in an A/V data generation mode. Here, the A/V data generation mode represents a mode of driving a microphone/camera to generate A/V data.

When it is determined in step 203 that the menu for live streaming of A/V data is selected in the A/V data generation mode, in step 205, the server MS generates and sends a message (e.g. an instant message) to the client MS. Here, the message may include an IP address, encoding information (for example, the type of A/V data codec) of the server MS, and information on a channel for live streaming. Alternatively, in an embodiment, the server MS associates with a Social Network Service (SNS) server to upload an IP address, encoding information (for example, the type of A/V data codec) of the server MS, and information on a channel for live streaming to an account of the server MS registered to the SNS server, thereby being capable of informing people around the server MS of corresponding information.

In step 207, the server MS determines whether an access request message for requesting transmission of TS data is received from the client MS. The access request message is sent by the client MS using the IP address of the server MS.

When it is determined in step 207 that the access request message is not received from the client MS during a preset time, the server MS terminates the process according to an embodiment of the present invention.

In contrast, when it is determined in step 207 that the access request message is received from the client MS, in step 209, the server MS encodes A/V data acquired in the A/V data generation mode, based on the encoding information. To that end, the server MS sets an internal codec based on the encoding information. If the access request message received from the client MS includes encoding information (for example, the type of A/V data codec) supported by the client MS, the server MS may recognize when the encoding information of the server MS is not supported by the client MS and set the codec based on the encoding information supported by the client MS.

In step 211, the server MS TS-multiplexes the encoded A/V data to generate TS data. Here, the TS-multiplexing is described in detail. The server MS compresses the encoded A/V data using a predetermined compression algorithm (e.g., Moving Picture Expert Group 2 (MPEG2)), binds a compressed bit stream in a packet form, and converts the bit stream into a plurality of A/V packets. Then, according to FIG. 4, the server MS generates TS data that includes the plurality of converted A/V packets and a TS header of each A/V packet. Here, the TS header includes a Program Identification (PID) representing information on whether a corresponding packet is an A packet or a V packet, and a Program Clock Reference (PCR) for synchronization acquisition.

In step 213, the server MS transmits the generated TS data to the client MS in a live streaming scheme through the channel and then terminates the process according to an embodiment of the present invention.

Figure 3:
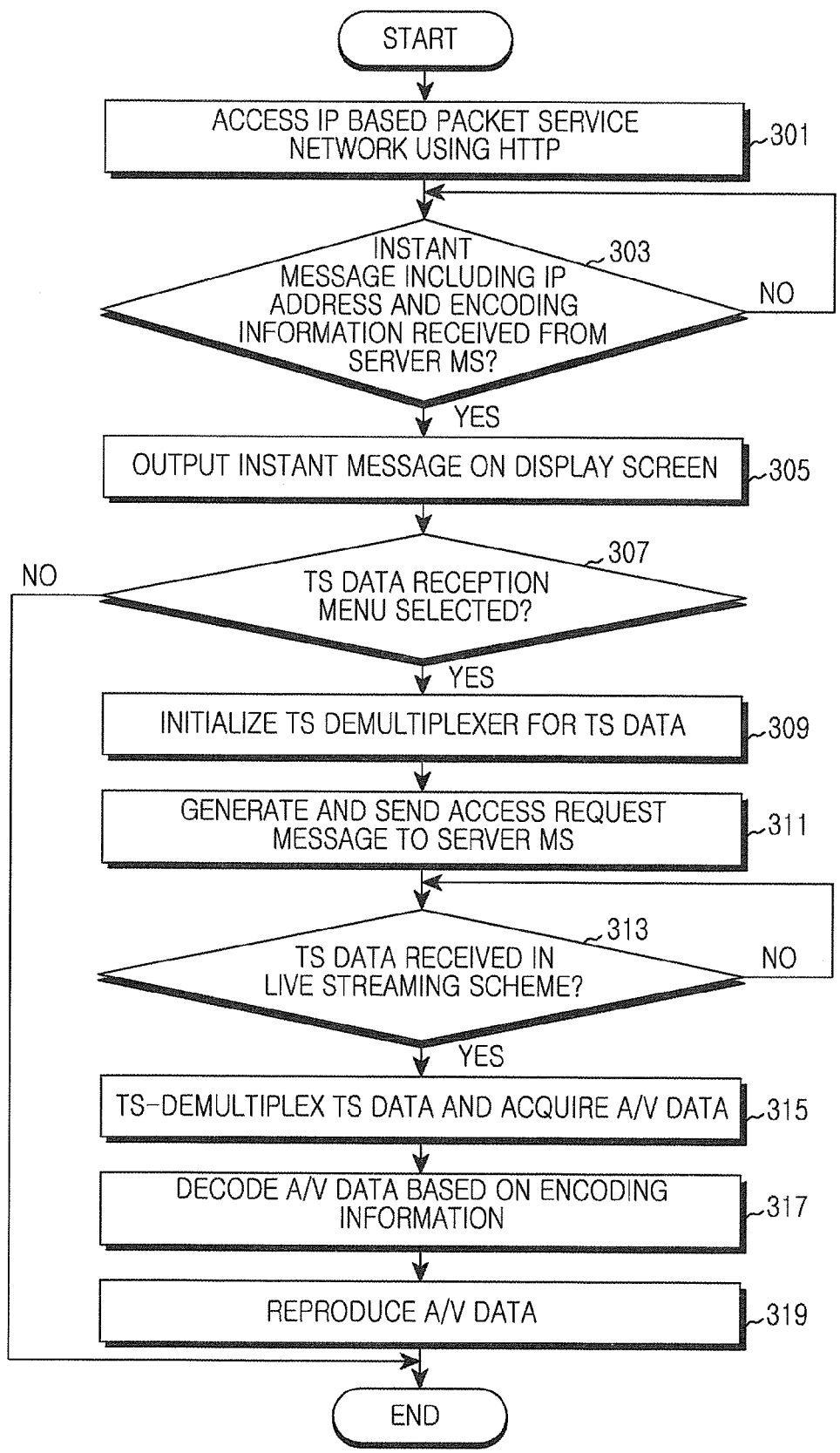
FIG. 3 illustrates a process of a client MS for live streaming between mobile communication terminals according to an embodiment of the present invention.
Figure 4:
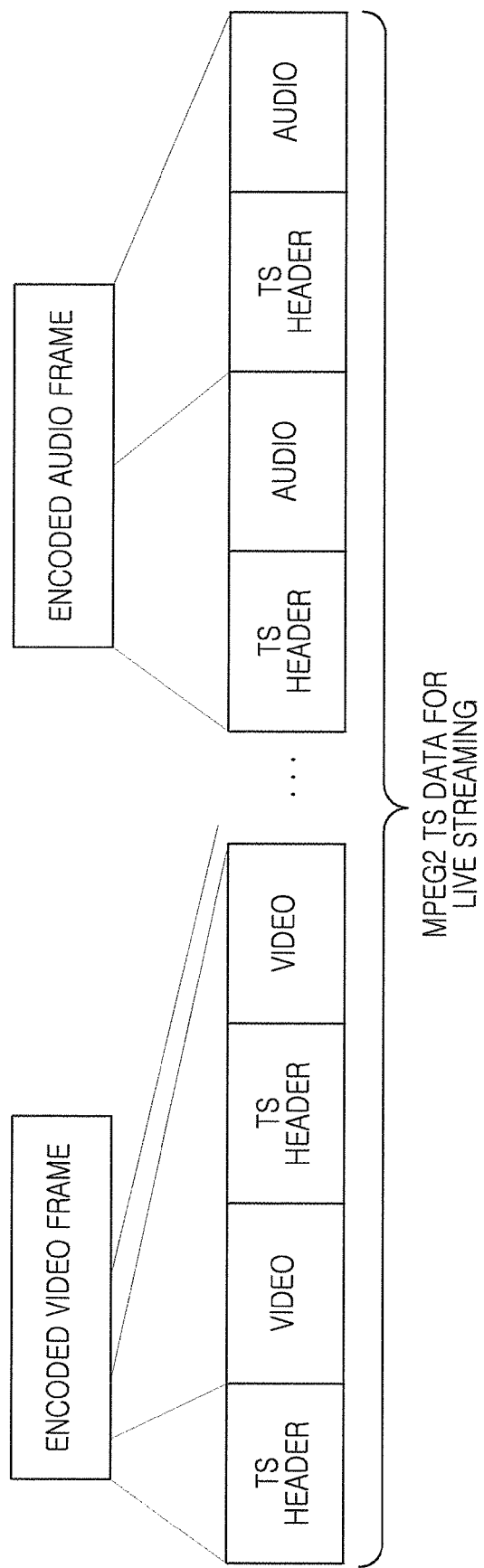
FIG. 4 illustrates an example of a format of Transport Stream (TS) data for live streaming between mobile communication terminals according to an embodiment of the present invention.

FIG. 3 illustrates a process of a client MS for live streaming between mobile communication terminals according to an embodiment of the present invention.

Referring to FIG. 3, in step 301, the client MS accesses an IP based packet service network (e.g., LTE, WiFi network) using an HTTP protocol.

In step 303, the client MS determines whether a message (e.g. an instant message) is received from a server MS. Here, the message includes an IP address, encoding information (e.g., the type of A/V data codec) of the server MS, and information on a channel for live streaming. Alternatively, in a an embodiment, the client MS associates with an SNS server to download the IP address and encoding information (e.g., the type of A/V data codec) of the server MS, and information on a channel for live streaming, from an account of the server MS registered to the SNS server, thereby being capable of acquiring corresponding information.

When it is determined in step 303 that the message is received from the server MS, in step 305, the client MS outputs the received message on a display screen. Accordingly, a user of the client MS can select a menu for reception (or non-reception) of TS data that the server MS can provide.

In step 307, the client MS determines whether the TS data reception menu is selected according to the user's key manipulation.

When it is determined in step 307 that the TS data reception menu is not selected during a preset time, the client MS terminates a process according to an embodiment of the present invention.

In contrast, when it is determined in step 307 that the TS data reception menu is selected, in step 309, the client MS initializes a TS demultiplexer for TS data. This is based on the assumption that the TS demultiplexer may be for a different use (e.g., DMB data) other than TS data. If the TS demultiplexer is used for TS data only, step 309 can be omitted.

In step 311, the client MS generates an access request message for requesting transmission of TS data, and sends the generated access request message to the server MS using the IP address of the server MS. If the encoding information (e.g., the type of A/V data codec) of the server MS is not supported by the client MS, the client MS can include, in the access request message, encoding information that is supported by the client MS and send the access request message to the server MS.

In step 313, the client MS determines whether TS data is received in a live streaming scheme from the server MS through the channel.

When it is determined in step 313 that the TS data is received in the live streaming scheme from the server MS, in step 315, the client MS TS-demultiplexes the received TS data and acquires A/V data. Here, the TS demultiplexing is described in detail. The client MS detects a plurality of A/V packets and a TS header of each A/V packet from the received TS data, restores a bit stream based on the detected plurality of A/V packets and TS header of each A/V packet, and decompresses the restored bit stream using a predetermined compression algorithm (e.g., MPEG2), thereby acquiring the encoded A/V data. In an embodiment, the TS header includes a PID representing information on whether a corresponding packet is an A packet or a V packet, and a PCR for synchronization clock, and the client MS can acquire synchronization using the PCR.

In step 317, the client MS decodes the acquired A/V data based on the encoding information.

In step 319, the client MS reproduces the decoded A/V data and then terminates the process according to an embodiment of the present invention.

As described above, embodiments of the present invention provide a way for live streaming between a server MS and a client MS that access an IP based packet service network without going through a separate live streaming server, thereby being capable of allowing an MS that does not realize a live streaming protocol to access the IP based packet service network and perform live streaming, and have the advantage of not needing supplementary storage for a separate live streaming server outside.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for live streaming between mobile communication terminals, the method comprising:
    in response to a first mobile terminal entering a streaming mode, sending, at the first mobile terminal, a message including information with regard to an Internet Protocol (IP) address of the first mobile terminal and a first codec of the first mobile terminal
    to a second mobile terminal;
    in response to receiving, at the first mobile terminal, a request message for access from the second mobile terminal, determining a third codec for encoding the audio and video data by the first mobile terminal, based on whether the request message includes information with regard to a second codec supported by the second mobile terminal,
    wherein determining the third codec comprises determining the third codec as the second codec when the request message includes the information with regard to the second codec,
    wherein determining the third codec comprises determining the third codec as the first codec when the request message does not include the information with regard to the second codec;
    encoding, at the first mobile terminal, the audio and video (A/V) data generated from the first mobile terminal, using the third codec;
    multiplexing, at the first mobile terminal, the encoded audio and video (A/V) data to generate Transport Stream (TS) data; and
    transmitting, at the first mobile terminal, the generated TS data in a live streaming scheme to the second mobile terminal through the streaming channel via an Internet Protocol (IP) based packet service network.

2. The method of claim 1, wherein the TS data comprises an A/V packet and a TS header of the A/V packet, and
    wherein the TS header comprises at least one of a Program Identification (PID) and a Program Clock Reference (PCR).

3. The method of claim 1, further comprising, before receiving the request message for access from the second mobile terminal, generating and sending a message to the second mobile terminal when a menu for live streaming of the A/V data is selected,
  wherein the message comprises at least one of an IP address of the first mobile terminal, encoding information of the first mobile terminal, and information on a channel for live streaming.

4. The method of claim 1, wherein encoding the A/V data comprise
  encoding the A/V data when the request message for requesting transmission of the TS data is received from the second mobile terminal,
  wherein the TS data is generated by multiplexing the encoded A/V data.

5. A method for live streaming between mobile communication terminals, the method comprising:
  receiving, at a second mobile terminal, a message including information with regard to an IP address of a first mobile terminal entered in a streaming mode, and a first codec of the first mobile terminal from the first mobile terminal;
  transmitting, at the second mobile terminal, a request message for access in which information with regard to a second codec is determined to be included based on whether the first codec is supported by the second mobile terminal;
  receiving Transport Stream (TS) data generated by the first mobile terminal, in a live streaming scheme from the first mobile terminal through the streaming channel via an accessed Internet Protocol (IP) based packet service network; and
  demultiplexing the received TS data and restoring original audio and video (A/V) data, using a third codec that is determined by the first mobile terminal.

6. The method of claim 5, wherein the TS data comprises an A/V packet and a TS header of the A/V packet, and
  wherein the TS header comprises at least one of a Program Identification (PID) and a Program Clock Reference (PCR).

7. The method of claim 5, further comprising,
  before transmitting the request message for access, outputting the message on a display screen when the message is received from the first mobile terminal; and
  transmitting the request message for requesting transmission of the TS data to the first mobile terminal when a reception menu for the TS data is selected,
  wherein the message comprises at least one of an IP address of the first mobile terminal, encoding information of the first mobile terminal, and information on a channel for live streaming.

8. The method of claim 7, further comprising initializing an internal TS demultiplexer for the TS data when the reception menu for the TS data is selected.

9. The method of claim 7, further comprising:
  decoding the restored original A/V data based on the encoding information of the first mobile terminal; and
  reproducing the decoded original A/V data.

10. A mobile terminal for live streaming between mobile communication terminals, the first mobile terminal comprising:
  a transceiver configured to:
    in response to the first mobile terminal entering a streaming mode, send a message including information with regard to an IP address of the first mobile terminal and a first codec of the first mobile terminal to a second mobile terminal; and
    in response to receiving a request message for access from the second mobile terminal, determine a third codec for encoding the audio and video data by the first mobile terminal based on whether the request for access includes information with regard to a second codec supported by the second mobile terminal,
  wherein the transceiver is configured to determine the third codec as the second codec when the request message includes the information with regard to second codec,
  wherein the transceiver is configured to determine the third codec as the first codec when the request message does not include the information with regard to the second codec;
  an audio and video codec configured to encode the audio and video (A/V) data generated from the first mobile terminal, using the third codec;
  a Transport Stream (TS) multiplexer configured to multiplex the encoded A/V data to generate TS data; and
  a processor configured to transmit the generated TS data in a live streaming scheme to the second mobile terminal through the streaming channel via an Internet Protocol (IP) based packet service network.

11. The first mobile terminal of claim 10, wherein the TS data comprises an A/V packet and a TS header of the A/V packet, and
  wherein the TS header comprises at least one of a Program Identification (PID) and a Program Clock Reference (PCR).

12. The first mobile terminal of claim 10, wherein the processor is further configured to generate and send a message to the second mobile terminal when a menu for live streaming of the A/V data is selected,
  wherein the message comprises at least one of an IP address of the first mobile terminal, encoding information of the first mobile terminal, and information on a channel for live streaming.

13. The first mobile terminal of claim 10, further comprising an A/V coder/decoder (codec) configured to encode the audio/video data when the request message for requesting transmission of the TS data is received from the second mobile terminal,
  wherein the TS data is generated by multiplexing the encoded audio/video data.

14. A mobile terminal for live streaming between mobile communication terminals, the second mobile terminal comprising:
  a transceiver configured to:
    receive a message including information with regard to an IP address of first mobile terminal entered in a streaming mode, and a first codec for encoding audio and video data from the first mobile terminal; and
    transmit a request message for access in which information with regard to a second codec is determined to be included based on whether the first codec is supported by the second mobile terminal;
  a processor configured to receive Transport Stream (TS) data generated by the first mobile terminal in a live streaming scheme from the first mobile terminal through the streaming channel via an accessed Internet Protocol (IP) based packet service network; and
  a TS demultiplexer configured to demultiplex the received TS data and restore original audio and video (A/V) data, using a third codec that is determined by the first mobile terminal.

15. The second mobile terminal of claim 14, wherein the TS data comprises an A/V packet and a TS header of the A/V packet, and
   wherein the TS header comprises at least one of a Program Identification (PID) and a Program Clock Reference (PCR).

16. The second mobile terminal of claim 14, wherein the processor is further configured to:
   output the message on a display screen when the message is received from the first mobile terminal, and transmit the request message for requesting transmission of the TS data to the first mobile terminal when a reception menu for the TS data is selected,
   wherein the message comprises at least one of an IP address of the first mobile terminal, encoding information of the first mobile terminal, and information on a channel for live streaming.

17. The second mobile terminal of claim 16, wherein the TS demultiplexer configured to be initialized for the TS data when the reception menu for the TS data is selected through an input unit.

18. The second mobile terminal of claim 16, further comprising:
   the audio and video codec configured to decode the restored original A/V data based on the encoding information of the first mobile terminal;
   a speaker configured to reproduce the decoded original audio data; and
   a display unit configured to reproduce the decoded original video data.

* * * * *